(12) United States Patent
Shetty

(10) Patent No.: US 9,954,946 B2
(45) Date of Patent: Apr. 24, 2018

(54) DIRECTORY LEVEL INCREMENTAL REPLICATION

(71) Applicant: NetApp Inc., Sunnyvale, CA (US)

(72) Inventor: Rithin Kumar Shetty, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 149 days.

(21) Appl. No.: 14/951,368

(22) Filed: Nov. 24, 2015

(65) Prior Publication Data

US 2017/0149886 A1 May 25, 2017

(51) Int. Cl.
G06F 15/16 (2006.01)
H04L 29/08 (2006.01)
G06F 3/06 (2006.01)

(52) U.S. Cl.
CPC .......... *H04L 67/1095* (2013.01); *G06F 3/065* (2013.01); *G06F 3/067* (2013.01); *G06F 3/0619* (2013.01); *G06F 3/0643* (2013.01); *H04L 67/1097* (2013.01)

(58) Field of Classification Search
CPC . G06F 3/06; G06F 3/067; G06F 3/065; G06F 3/0643; G06F 3/0619; G06F 11/2066; G06F 17/30067; G06F 11/2074; G06F 11/1451; H04L 29/08; H04L 67/1097; H04L 67/1095
See application file for complete search history.

(56) References Cited

U.S. PATENT DOCUMENTS

| | | | |
|---|---|---|---|
| 6,993,539 B2 | 1/2006 | Federwisch et al. | |
| 7,818,299 B1 | 10/2010 | Federwisch et al. | |
| 8,099,571 B1 | 1/2012 | Driscoll et al. | |
| 8,504,529 B1* | 8/2013 | Zheng | G06F 11/1469 707/679 |
| 8,719,286 B1* | 5/2014 | Xing | G06F 11/1451 707/755 |
| 8,914,595 B1 | 12/2014 | Natanzon | |
| 2013/0073519 A1* | 3/2013 | Lewis | G06F 17/30215 707/610 |
| 2013/0339298 A1* | 12/2013 | Muller | G06F 17/30283 707/640 |
| 2013/0339407 A1* | 12/2013 | Sharpe | G06F 17/30194 707/827 |

(Continued)

OTHER PUBLICATIONS

Int. Search Report/Written Opinion cited in PCT Application No. Pct/US2016/063317 dated Mar. 2, 2017, 12 pgs.

*Primary Examiner* — Benjamin M Thieu
(74) *Attorney, Agent, or Firm* — Cooper Legal Group, LLC

(57) ABSTRACT

One or more techniques and/or computing devices are provided for directory level incremental replication. For example, a first storage controller may evaluate a base snapshot and an incremental snapshot of a source subdirectory to generate a set of operations that can be used by a second storage controller for reconstructing a mirror of the source subdirectory as reflected by the incremental snapshot. Accordingly, the first storage controller may send the set of operations and/or source data to the second storage controller for constructing a destination directory structure mirroring the source subdirectory. In this way, replication may be achieved at an arbitrary level of granularity, such as to replicate a particular subdirectory of a volume.

20 Claims, 12 Drawing Sheets

(56) References Cited

U.S. PATENT DOCUMENTS

2014/0062354 A1* 3/2014 Choi ................... H02M 5/4585
                                                    318/400.3
2016/0127307 A1* 5/2016 Jain ....................... G06F 3/0619
                                                     709/245

* cited by examiner

DIRECTORY LEVEL INCREMENTAL REPLICATION

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

Various replication and synchronization techniques may be used to replicate data (e.g., client data), configuration data (e.g., a size of a volume, a name of a volume, etc.), and/or write caching data (e.g., cached write operations) between storage controllers and/or storage devices. In an example, a storage operation, targeting the first storage device, may be split and replicated as a replicated storage operation targeting the secondary storage device. Upon successful commitment of the storage operation to the first storage device and the replicated storage operation to the secondary storage device, a complete notification may be provided to a host that issued the storage operation. In this way, synchronous replication may be achieved. In another example, snapshots of a source volume (e.g., within the first storage device) may be used to replicate the source volume to a destination volume (e.g., within the secondary storage device). For example, a base snapshot of the source volume may be used to initially create the destination volume. A current incremental snapshot of the source volume may be used to replicate changes made to the source volume since the base snapshot or since a last incremental snapshot. Unfortunately, a client may merely have an interest in replicating a portion of the volume, such as a subdirectory (e.g., or any other arbitrary portion of the volume), and thus volume level replication techniques may waste computing resources and bandwidth replicating the entire volume such as data with which the client does not have an interest in replicating. Such inefficiencies become even more problematic as the size of volumes increase.

DETAILED DESCRIPTION

Figure 1:
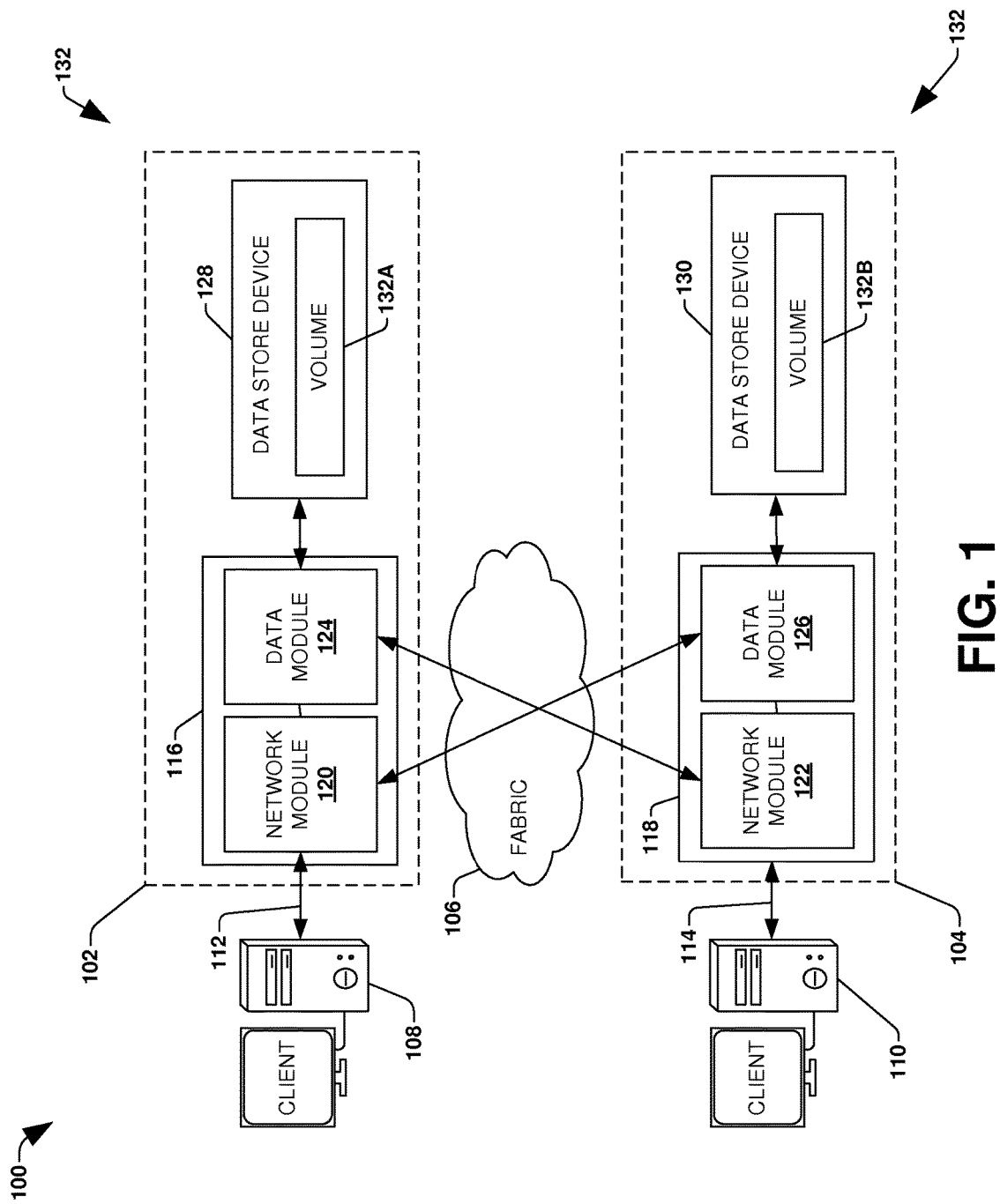
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for directory level incremental replication are provided. A client may have an interest in replicating a portion of source volume to a destination volume, such as for disaster or failover recovery purposes (e.g., if a first storage controller, hosting the source volume fails, then a second storage controller may provide clients with failover access to replicated data within the destination volume). Volume level replication and/or other non-arbitrary levels of replication may replicate data that the client does not have an interest in replicating, thus wasting computing resources and network bandwidth. Accordingly, as provided herein, an arbitrary level of granularity for replicating data may be provided. For example, a qtree, a directory under the qtree, a directory under a root directory, a subdirectory, and/or any other arbitrary grouping of data may be replicated from a source storage device to a destination storage device using a base snapshot and incremental snapshots. In this way, computing resources and bandwidth are conserved by merely replicating data of interest, such as a source subdirectory.

To provide context for directory level incremental replication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that implementing directory level incremental replication may be implemented within the clustered network environment 100. In an example, a subdirectory or any other arbitrary grouping of data within volume 132A of the node 116 (e.g., a first storage controller) may be replicated to the volume 132B of the node 118 (e.g., a second storage controller). In this way, incremental replication of data at an arbitrary level of granularity, such as a subdirectory level, may be implemented. It may be appreciated that directory level incremental replication may be implemented for and/or between any type of computing environment, and may be transferrable between physical devices (e.g., node 116, node 118, etc.) and/or a cloud computing environment (e.g., remote to the clustered network environment 100).

Figure 2:
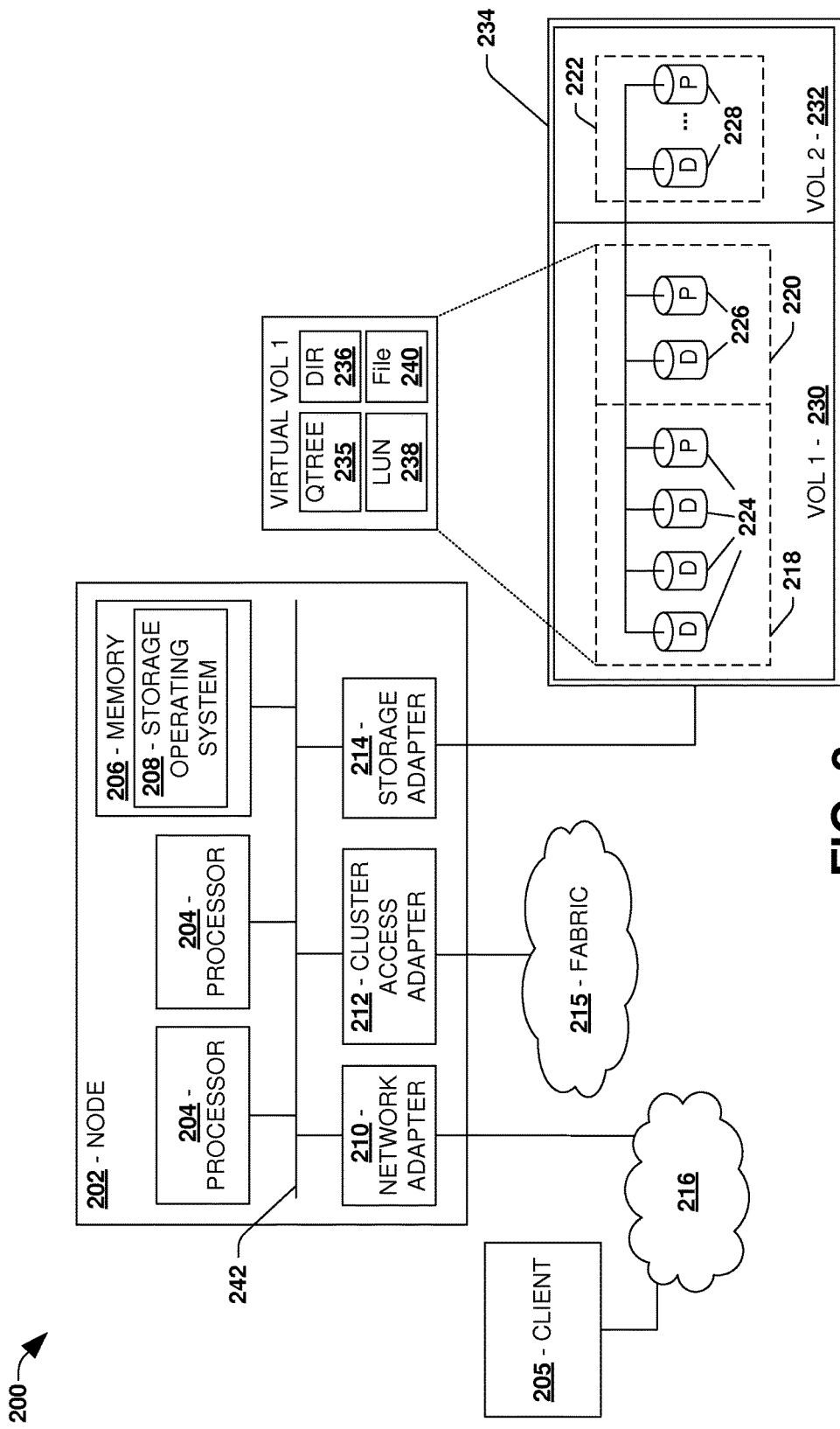
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that implementing directory level incremental replication may be implemented for the data storage system 200. In an example, a subdirectory or any other arbitrary grouping of data within the volume 230 and/or the volume 232 of the node 202 (e.g., a first storage controller) may be replicated to a volume of another node (e.g., a second storage controller). In this way, incremental replication of data at an arbitrary level of granularity, such as a subdirectory level, may be implemented. It may be appreciated that directory level incremental replication may be implemented for and/or between any type of computing environment, and may be transferrable between physical devices (e.g., node 202, host device 205, etc.) and/or a cloud computing environment (e.g., remote to the node 202 and/or the host device 205).

Figure 3:
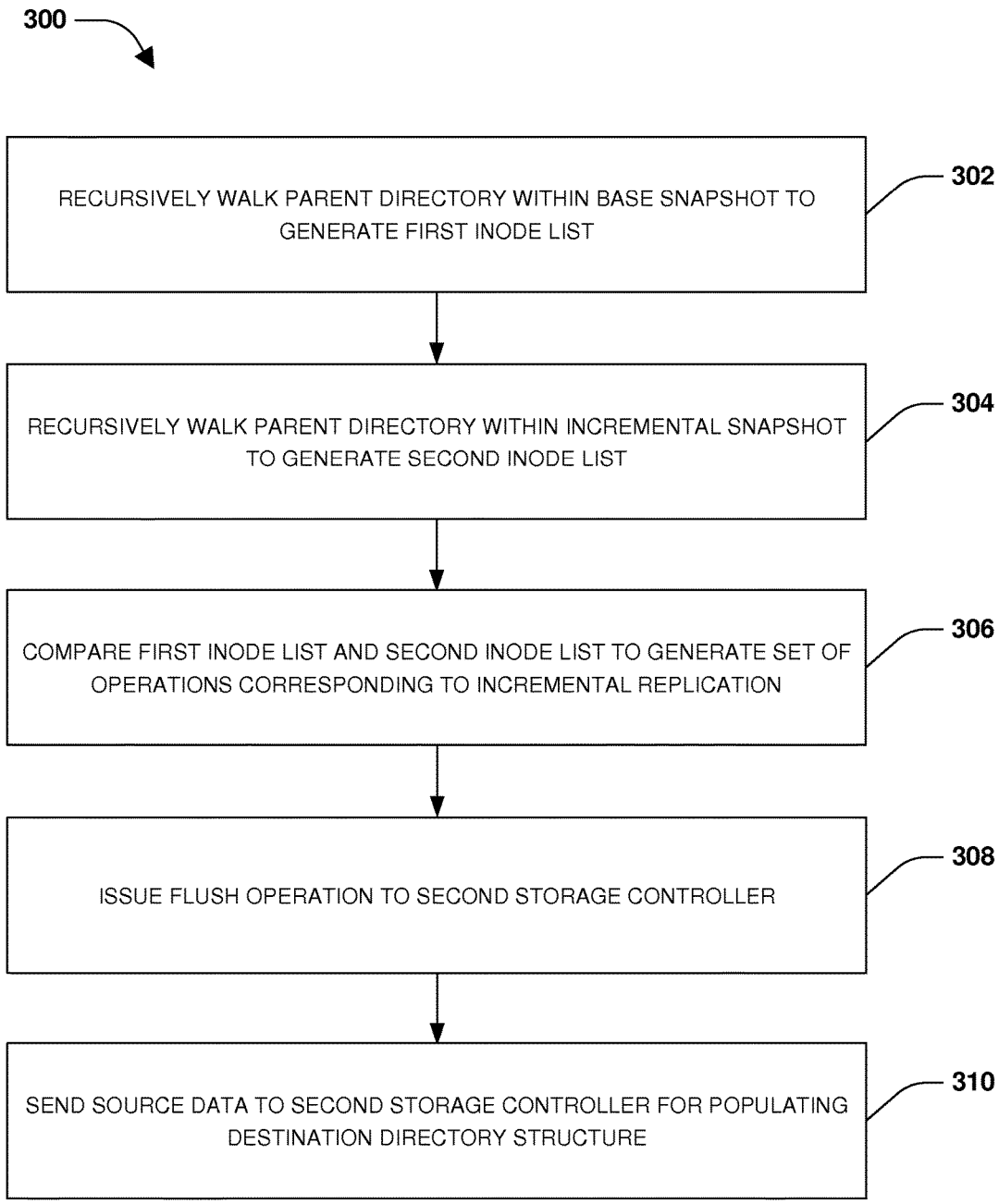
FIG. 3 is a flow chart illustrating an exemplary method of directory level incremental replication.

One embodiment of directory level incremental replication is illustrated by an exemplary method 300 of FIG. 3. A first storage controller may host a source volume. The source volume may comprise a source subdirectory and/or other subdirectories. A base snapshot of the source volume may be created as a point-in-time representation of the source volume. The base snapshot may be used to recreate the source volume at a second storage controller as a destination volume. Incremental snapshots of the source volume may be created. A difference between the base snapshot and an incremental snapshot may reflect modifications made to the source volume during a time between when the base snapshot was created and when the incremental snapshot was created. A client may specify that the source subdirectory or any other arbitrary grouping of data is to be replicated to the first storage controller, such as incrementally replicated from the source volume to the destination volume based upon differences between the base snapshot and incremental snapshots.

At 302, a parent directory within the base snapshot may be recursively walked to generate a first inode list corresponding to files within the base snapshot (e.g., files within the source subdirectory). When the source subdirectory is encountered within the base snapshot, then inode numbers, generation numbers, file paths, and/or file types of files within the source subdirectory may be extracted for inclusion within the first inode list. In an example, the first inode list may be sorted based upon inode numbers.

At 304, the parent directory within the incremental snapshot may be recursively walked to generate a second inode list corresponding to files within the incremental snapshot (e.g., files within the source subdirectory). When the source subdirectory is encountered within the incremental snapshot, then inode numbers, generation numbers, file paths, and/or file types of files within the source subdirectory may be extracted for inclusion within the second inode list. In an example, the second inode list may be sorted based upon inode numbers.

In another example of obtaining a list of inodes, an inode file within the base snapshot may be compared with a corresponding inode file within the incremental snapshot, such as using a buftree differencing technique, to obtain a list of changed inode file blocks (e.g., about 4 KB or any other size). A inode file block may comprise about 21 inodes or any other number of inodes. The inode file block may be a flat inode table (e.g., inode #100 may be at the same offset in both the base snapshot and the incremental snapshot). In this way, when the buftree difference technique is used to obtain the list of changed inode file blocks, data within the changed inode file blocks may be compared to identify created inodes present only within the incremental snapshot, deleted inodes present only within the base snapshot, and/or modified inodes such as modified or renamed inodes. Upon obtaining the list of changed inode file blocks and corresponding attributes of such inodes, full file paths are obtained such as by using an inode to path feature of a storage operating system. Inodes that are not within the source subdirectory of interest can be filtered out.

At 306, the first inode list and the second inode list are compared (e.g., inode numbers may be used as keys for comparing inodes, from the first inode list and the second inode list, that have the same inodes and generation numbers) to generate a set of operations (e.g., directory tree creation instructions that can be used by the second storage controller to reconstruct the source subdirectory as a destination subdirectory corresponding to a difference between the base snapshot and the incremental snapshot, or to update the destination subdirectory based upon the difference). In another example, the list of changed inode file blocks, attributes, and/or full file paths are used to generate the set of operations. The set of operations correspond to an incremental replication of the source subdirectory, within the source volume hosted by the first storage controller, to the destination volume hosted by the second storage controller. The incremental replication corresponds to the difference between the base snapshot of the source subdirectory and the incremental snapshot of the source directory (e.g., inode numbers, generation numbers, file paths, file types, and/or other information within the inode lists may be compared to identify files, directories, and/or hard links that are new, moved, or deleted). The set of operations are sent to the second storage controller with full file paths. In an example of a create operation or a delete operation, a full file path of a root of the destination subdirectory is specified. In an example of a move operation, a full file path from the base snapshot (e.g., the old location) and a full file path from the incremental snapshot (e.g., the new location) is specified. In an example, the set of operations and/or the full file paths may be used to facilitate resynchronization between 2 cascading legs of a cascading relationship of snapshots (e.g., synchronization with a common snapshot can be implemented for a first cascading leg of snapshots A→B→C and a second cascading leg of snapshots A→C).

In an example, the set of operations comprises a directory move operation corresponding to a directory, within the source subdirectory, that moved to a new location from when the base snapshot was captured to when the incremental snapshot was captured. In another example, the set of operations comprises a file move operation corresponding to a file, within the source subdirectory, that moved to a new location from when the base snapshot was captured to when the incremental snapshot was captured. In another example, the set of operations comprises a hard link move operation corresponding to a hard link, within the source subdirectory, that moved to a new location from when the base snapshot was captured to when the incremental snapshot was captured.

In an example, the set of operations comprises a directory creation operation corresponding to a directory, within the source subdirectory, that was created after the base snapshot was captured and existed when the incremental snapshot was captured. In another example, the set of operations comprises a file creation operation corresponding to a file, within the source subdirectory, that was created after the base snapshot was captured and existed when the incremental snapshot was captured. In another example, the set of operations comprises a hard link creation operation corresponding to a hard link, within the source subdirectory, that was created after the base snapshot was captured and existed when the incremental snapshot was captured. In an example, if the set of operations comprises a create directory operation of a directory and a create file operation for a file under the directory, then the second storage controller may be capable of creating the directory and the file under the directory regardless of the order with which the creation directory operation and the create file operation are received by the second storage controller.

In an example, the set of operations comprises a directory delete operation corresponding to a directory, within the source subdirectory, that existed when the base snapshot was captured and did not exist when the incremental snapshot was captured. In another example, the set of operations comprises a file delete operation corresponding to a file, within the source subdirectory, that existed when the base snapshot was captured and did not exist when the incremental snapshot was captured. In another example, the set of operations comprises a hard link delete operation corresponding to a hard link, within the source subdirectory, that existed when the base snapshot was captured and did not exist when the incremental snapshot was captured.

In an example of creating an operation, a delete operation for a first inode existing within the base snapshot, but not the incremental snapshot, may be generated for inclusion within the set of operations. In another example, a new creation operation for a second inode existing within the incremental snapshot, but not the base snapshot, may be generated for inclusion within the set of operations. In another example, a move operation for a third inode, indicative of a first location within the base snapshot and a new location within the incremental snapshot, may be generated for inclusion within the set of operations. In this way, the set of operations may be provided to the second storage controller for implementation and/or buffering for later implementation to perform the incremental replication.

At 308, a flush operation may be issued to the second storage controller. The flush operation may instruct the second storage controller to implement the set of operations, such as buffered operations from the set of operations. Once the second storage controller has implemented the set of operations to create a destination directory structure reflecting a source directory structure of the source subdirectory as reflected by the incremental snapshot (e.g., or to update an existing destination subdirectory to reflect the source directory structure), the second storage controller may request source data from the first storage controller for populating the destination directory structure.

At 310, responsive to receiving a request for source data from the second storage controller, the source data may be sent to the second storage controller for populating the destination directory structure to correspond to the source subdirectory as reflected by the incremental snapshot. In this way, the destination directory structure is populated with the source data to create or update the destination subdirectory to mirror the source subdirectory as reflected by the incremental snapshot.

In an example, deduplication may be preserved for populating the destination directory structure. For example, a data block name, corresponding to a source data block that is to be replicated to the second storage controller for populating the destination directory structure, may be sent to the second storage controller (e.g., a block level difference evaluation technique may process a file to identify source blocks of the file that have changed). The second storage controller may perform a lookup to determine whether the second storage controller has access to a destination data block corresponding to the source data block (e.g., whether the second storage controller has already stored the source data block as the destination data block). Responsive to receiving an indication from the second storage controller that the second storage controller does not have access to the destination data block, the source data block may be sent to the second storage controller. Otherwise, the first storage controller may refrain from sending the source data block, which may reduce network bandwidth by not sending duplicate data to the second storage controller. In an example, compression may be preserved for populating the destination directory structure. For example, compressed source data may be sent to the second storage controller for populating the destination directory structure. In this way, the destination directory structure may be generated and/or updated to be a mirror of the source directory structure when the incremental snapshot was created.

Figure 4:
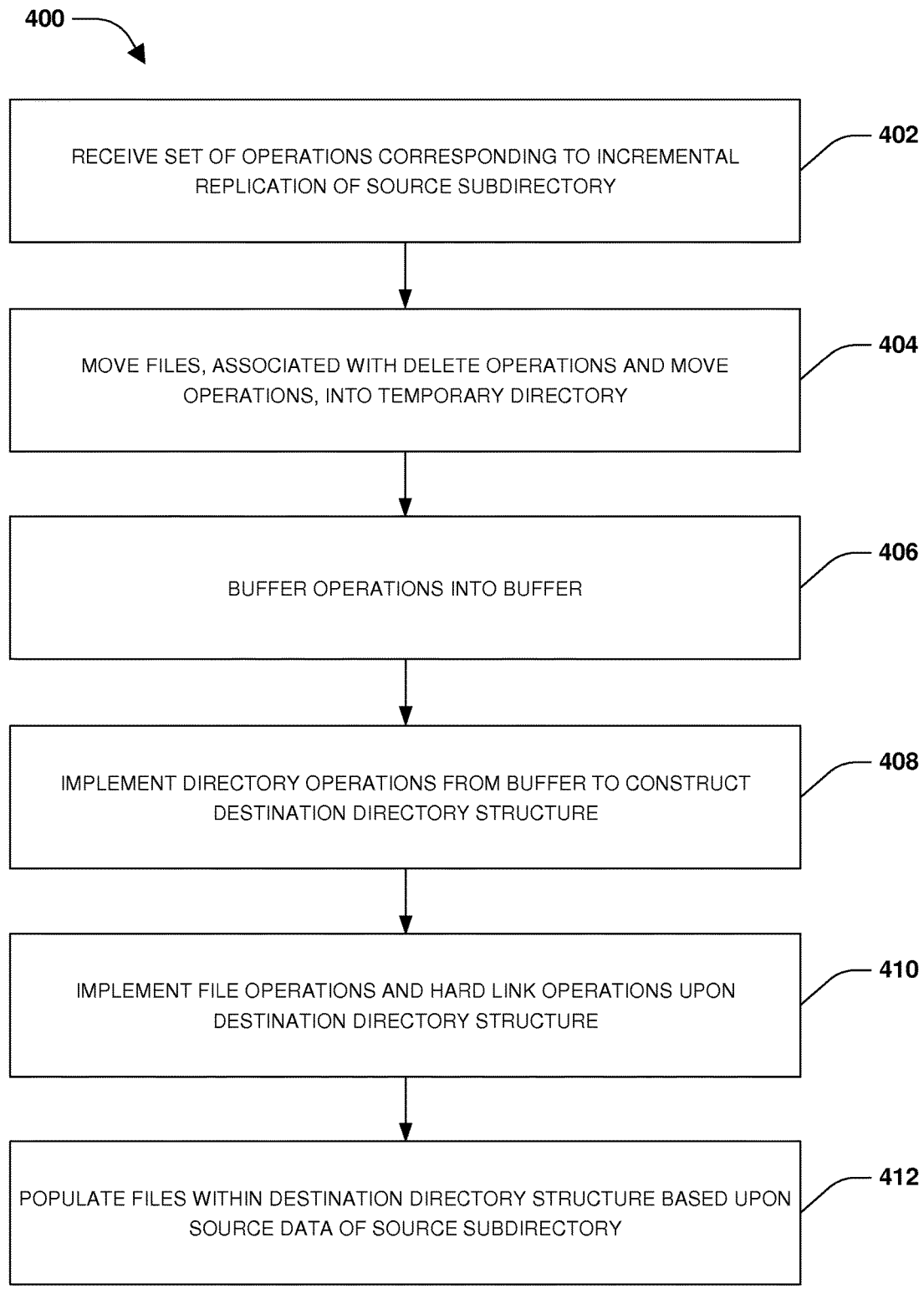
FIG. 4 is a flow chart illustrating an exemplary method of directory level incremental replication.

One embodiment of directory level incremental replication is illustrated by an exemplary method 400 of FIG. 4. A first storage controller may host a source volume. The source volume may comprise a source subdirectory and/or other subdirectories. A base snapshot of the source volume may be created as a point-in-time representation of the source volume. The base snapshot may be used to recreate the source volume at a second storage controller as a destination volume. Incremental snapshots of the source volume may be created. A difference between the base snapshot and an incremental snapshot may reflect modifications made to the source volume during a time between when the base snapshot was created and when the incremental snapshot was created. A client may specify that the source subdirectory or any other arbitrary grouping of data is to be replicated to the first storage controller, such as incrementally replicated from the source volume to the destination volume based upon differences between the base snapshot and incremental snapshots.

At 402, the second storage controller may receive a set of operations from the first storage controller. The set of operations correspond to an incremental replication of the source subdirectory within the source volume hosted by the first storage controller. The incremental replication corresponds to a difference between the base snapshot of the source subdirectory and the incremental snapshot of the source subdirectory. In an example, the incremental replication is at a subdirectory granularity where the source subdirectory, but not a second source subdirectory, of the source volume is replicated from the first storage controller to the second storage controller. For example, a client may specify an arbitrary group of data within the source volume to replicate, such that other data within the source volume is not replicated, which may conserve computing resources and/or bandwidth otherwise wasted when replicating data that the client does not have an interest in replicating.

At 404, files, associated with move operations and delete operations of the set of operations, are moved into a temporary directory. These files may be moved into the temporary directory such as for use in the event the files are needed during a rollback (e.g., the rollback may be used in the event the incremental replication is aborted) and/or to mitigate the recreation of large files that are moved to a new location (e.g., instead of deleting a large file from an old location and then recreating the large file at the new location). New names (e.g., unique names) may be assigned to files, moved into the temporary directory, based upon parent inode directory numbers and file names, which may avoid naming conflicts. At 406, the move operations, new file creation operations, new directory creation operations, and/or new hard link creation operations are moved into a buffer.

A flush operation may be received from the first storage controller. The flush operation may instruct the second storage controller to implement buffered operations within the buffer. At 408, directory move operations and new directory creation operations are implemented from the buffer to construct or update a destination directory structure corresponding to a source directory structure of the source subdirectory as reflected by the incremental snapshot. At 410, file move operations, new file creation operations, and new hard link creation operations (e.g., and/or hard link move operations) may be implemented upon the destination directory structure. In this way, files and hard links may be populated within the destination directory structure.

At 412, files within the destination directory structure are populated based upon source data, of the source subdirectory, received from the first storage controller. For example, the source data may comprise a source data block corresponding to a difference of a file between the baseline snapshot and the incremental snapshot. In an example, compression may be preserved by populating the destination directory structure with compressed source data from the first storage controller while retaining a compression of the compressed source data. In another example, deduplication may be preserved for populating the destination directory structure. For example, a data block name may be received from the first storage controller. The data block name may correspond to a source data block that is to be sent from the first storage controller to the second storage controller for populating the destination directory structure (e.g., a block level difference evaluation technique may process a file to identify source blocks of the file that have changed). A lookup table may be evaluated to determine whether a destination data block, stored by the second storage controller, corresponds to the data block name. Responsive to identifying the destination data block, deduplication may be implemented to utilize the destination data block for populating the destination directory structure (e.g., the destination directory structure may be populated with a reference to the destination data block or the destination data block may be locally copied into the destination directory structure). Responsive to not identifying the destination data block, the source data block may be retrieved from the first storage controller for populating the destination directory structure.

In this way, the destination directory structure may be generated and/or updated to be a mirror of the source directory structure when the incremental snapshot was created. In an example, the destination directory structure may be used to perform a directory level restore to restore the source subdirectory (e.g., the source subdirectory may become corrupt or unavailable, and thus may be restored using the destination directory structure).

Figure 5A:
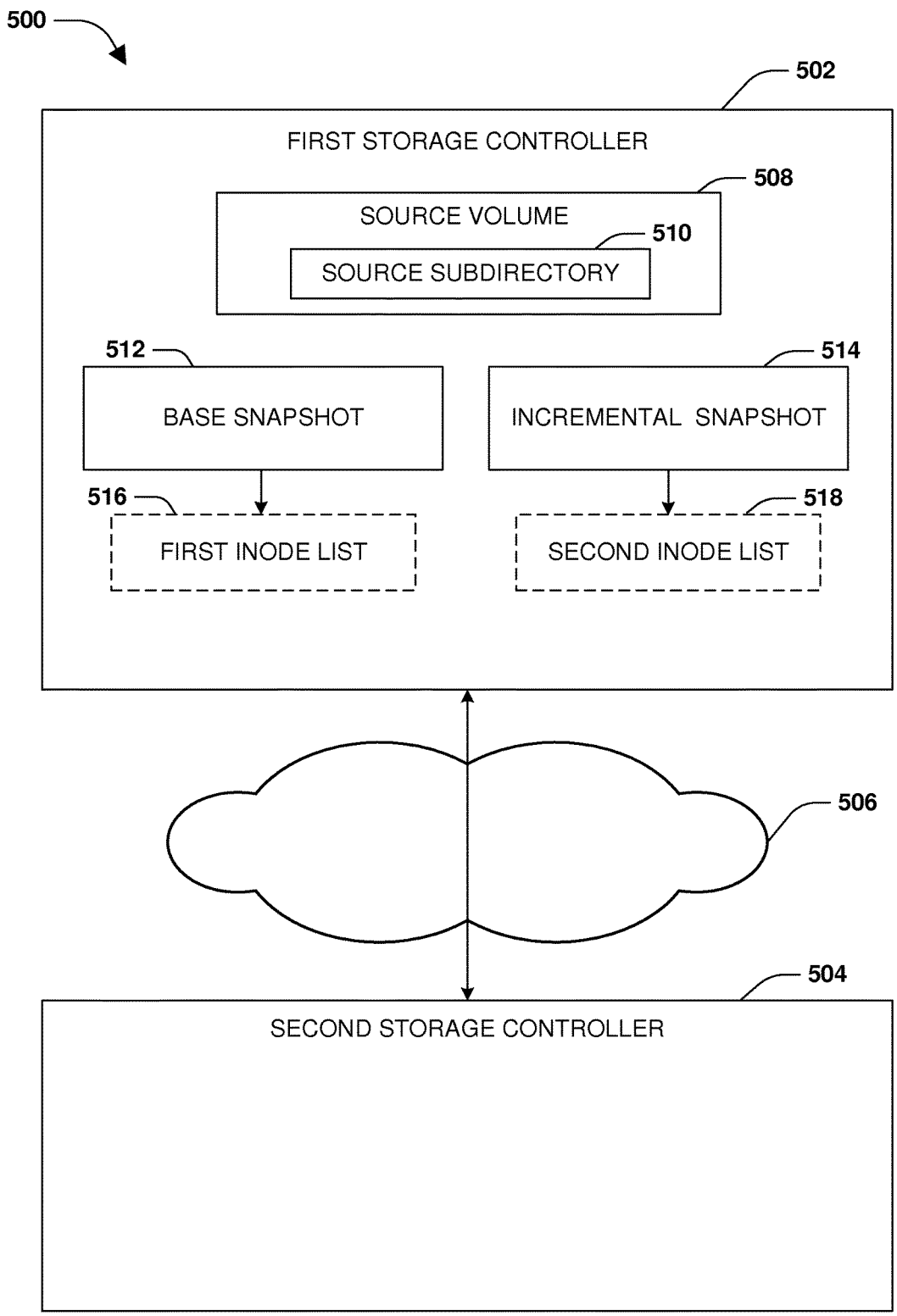
FIG. 5A is a component block diagram illustrating an exemplary computing device for directory level incremental replication, where inode lists are generated.

FIGS. 5A-5G illustrate examples of a system 500 for directory level incremental replication. FIG. 5A illustrates a first storage controller 502 and a second storage controller 504 having connectivity over a network 506 (e.g., the storage controllers may reside in the same or different clusters). The first storage controller 502 may comprise a source volume 508 comprising a source subdirectory 510 and/or other subdirectories. A base snapshot 512 of the source volume 508 may be captured at a first point in time. An incremental snapshot 514 of the source volume 508 may be captured at a subsequent point in time. A parent directory of the base snapshot 512 may be recursively walked to generate a first inode list 516 (e.g., inode numbers, generation numbers, file paths, file types, and/or other information of the source subdirectory 510 may be extracted and populated within the first inode list 516). The parent directory of the incremental snapshot 514 may be recursively walked to generate a second inode list 518 (e.g., inode numbers, generation numbers, file paths, file types, and/or other information of the source subdirectory 510 may be extracted and populated within the second inode list 518).

Figure 5B:
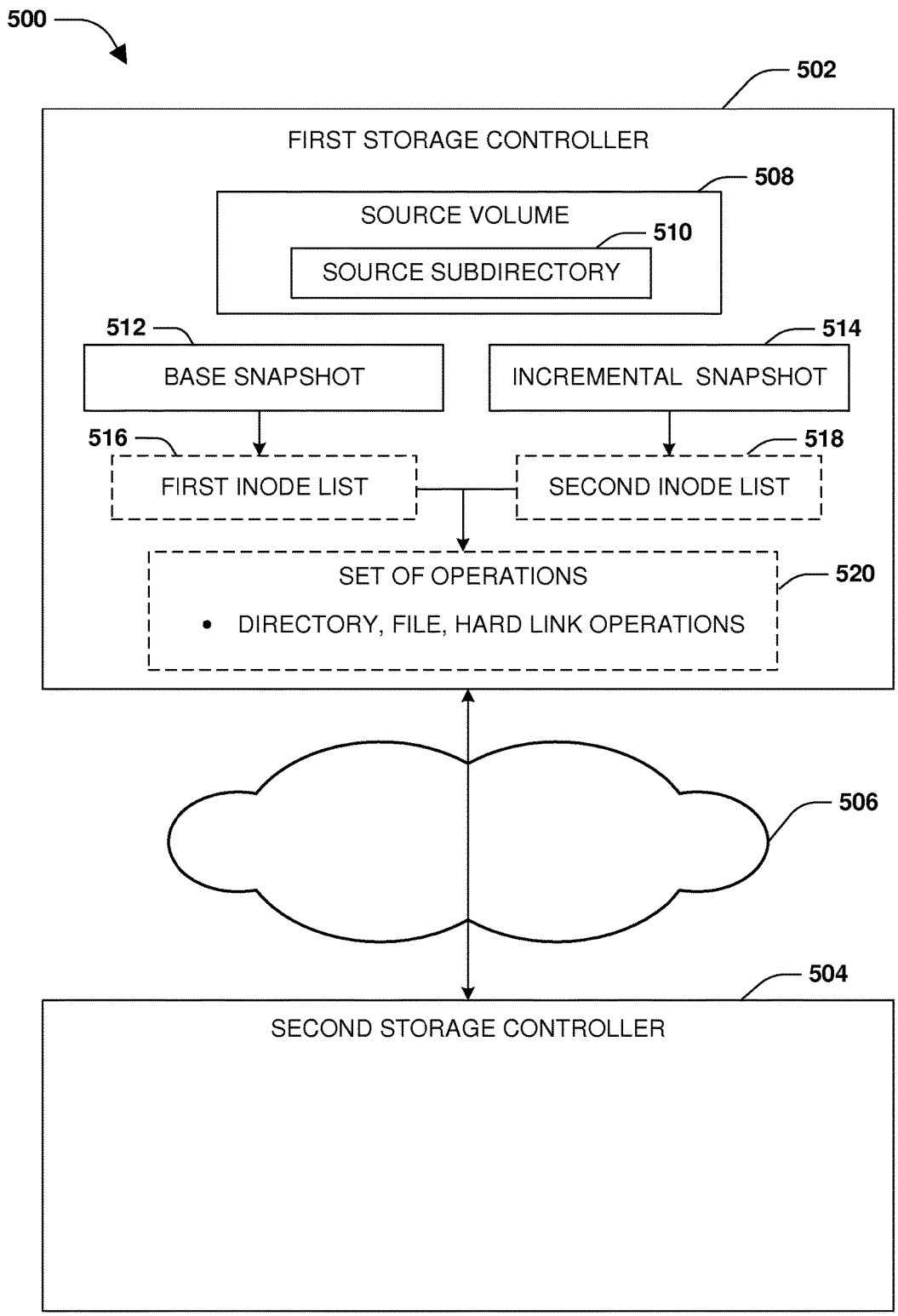
FIG. 5B is a component block diagram illustrating an exemplary computing device for directory level incremental replication, where a set of operations are generated.

FIG. 5B illustrates a comparison of the first inode list 516 and the second inode list 518 to create a set of operations 520. The set of operations 520 may comprise directory create, delete, and/or move operations, file create, delete, and/or move operations, and/or hard link create, delete, and/or move operations. The set of operations 520 may correspond to directory tree creation operations that may be implemented by the second storage controller 504 to construct a destination directory structure (e.g., or update an existing destination directory structure) corresponding to a source directory structure of the source subdirectory as reflected by the incremental snapshot 514. For example, the set of operations 520 correspond to a difference in directories, files, and/or hard links of the source subdirectory 510 between when the base snapshot 512 was captured and when the incremental snapshot 514 was captured.

Figure 5C:
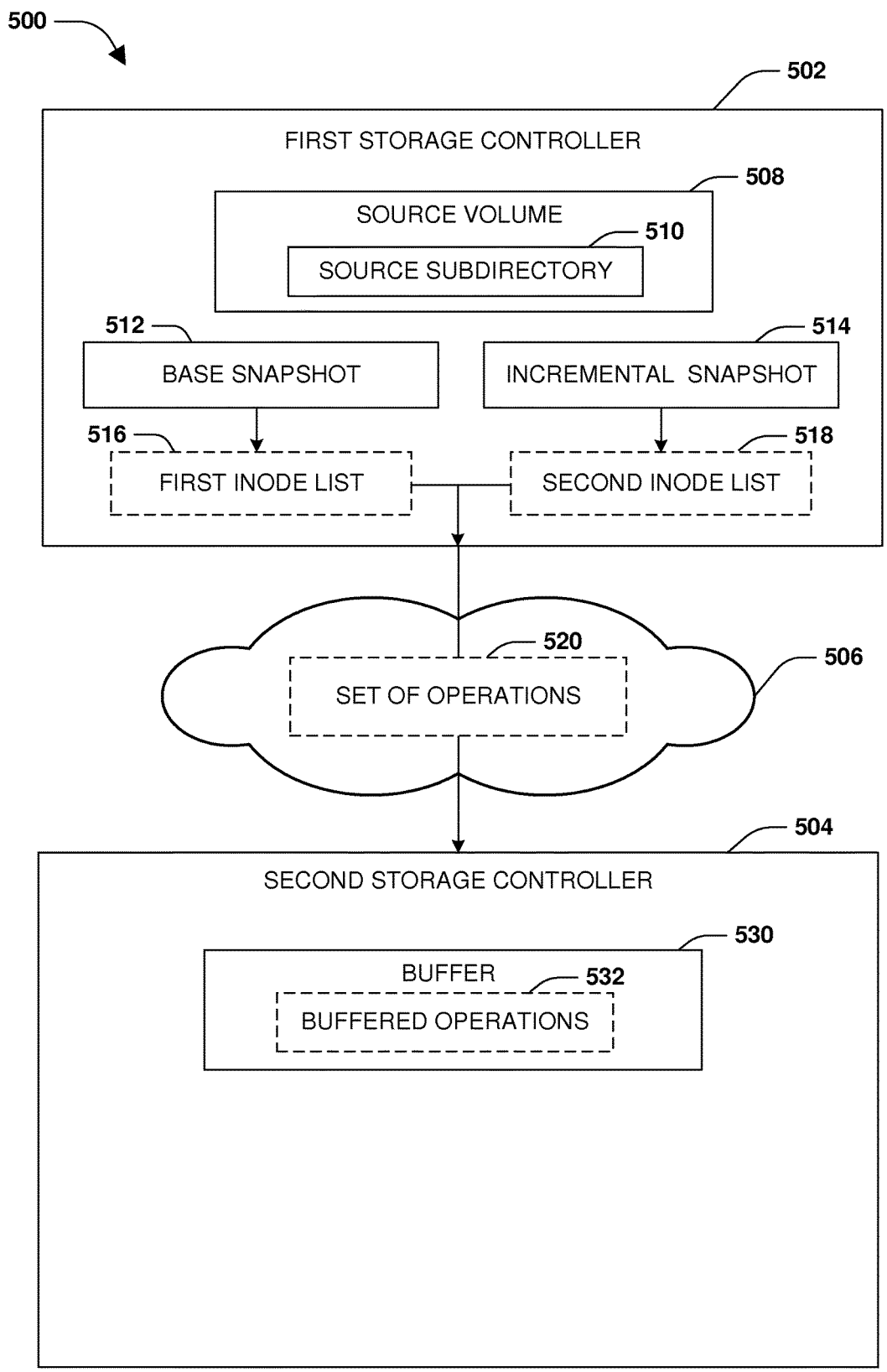
FIG. 5C is a component block diagram illustrating an exemplary computing device for directory level incremental replication, where a set of operations are sent to a second storage controller.

FIG. 5C illustrates the first storage controller 502 transmitting the set of operations 520 to the second storage controller 504. The set of operations 520 may be sent at the same time or at different times (e.g., sent over time as the operations are created). In an example, the second storage controller 504 may buffer at least some of the operations within the set of operations 502 as buffered operations 532 within a buffer 530. For example, move operations and/or new creation operations for files, directories, and/or hard links may be buffered within the buffer 530 (e.g., whereas file delete operations may be implemented without buffering).

Figure 5D:
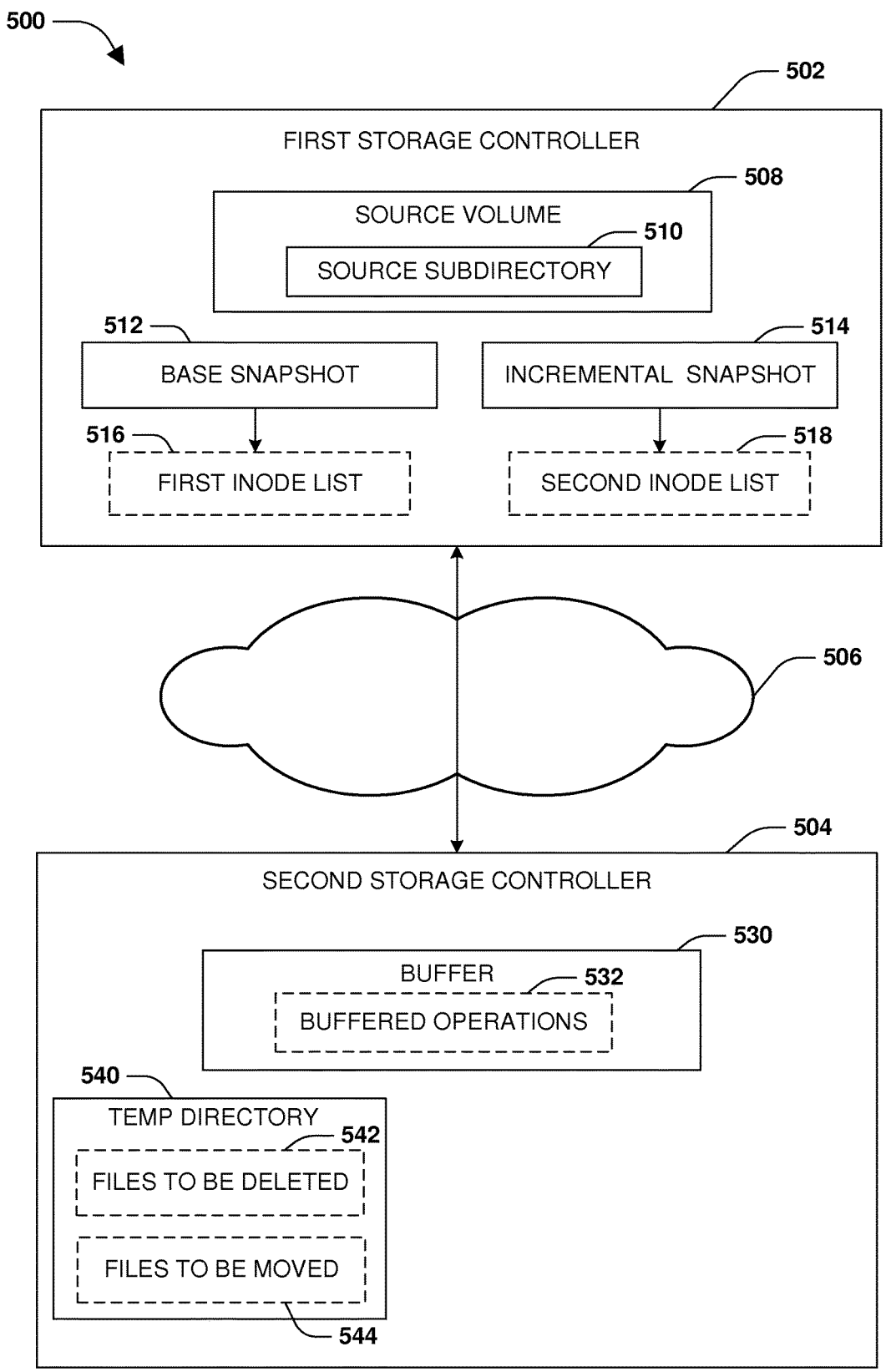
FIG. 5D is a component block diagram illustrating an exemplary computing device for directory level incremental replication, where files, associated with delete operations and move operations, are moved into a temporary directory.

FIG. 5D illustrates the second storage controller 504 moving files 542 associated with delete operations and files 544 associated with move operations into a temporary directory 540. Thus, if a rollback needs to be implemented (e.g., due to an error or an abort of the incremental replication), then the files 542 and files 544 will be readily accessible. Also, if a large file is to be moved from a first location to a second location, then the large file does not have to be deleted from the first location and completely recreated at the second location because the large file is available within the temporary directory 540.

Figure 5E:
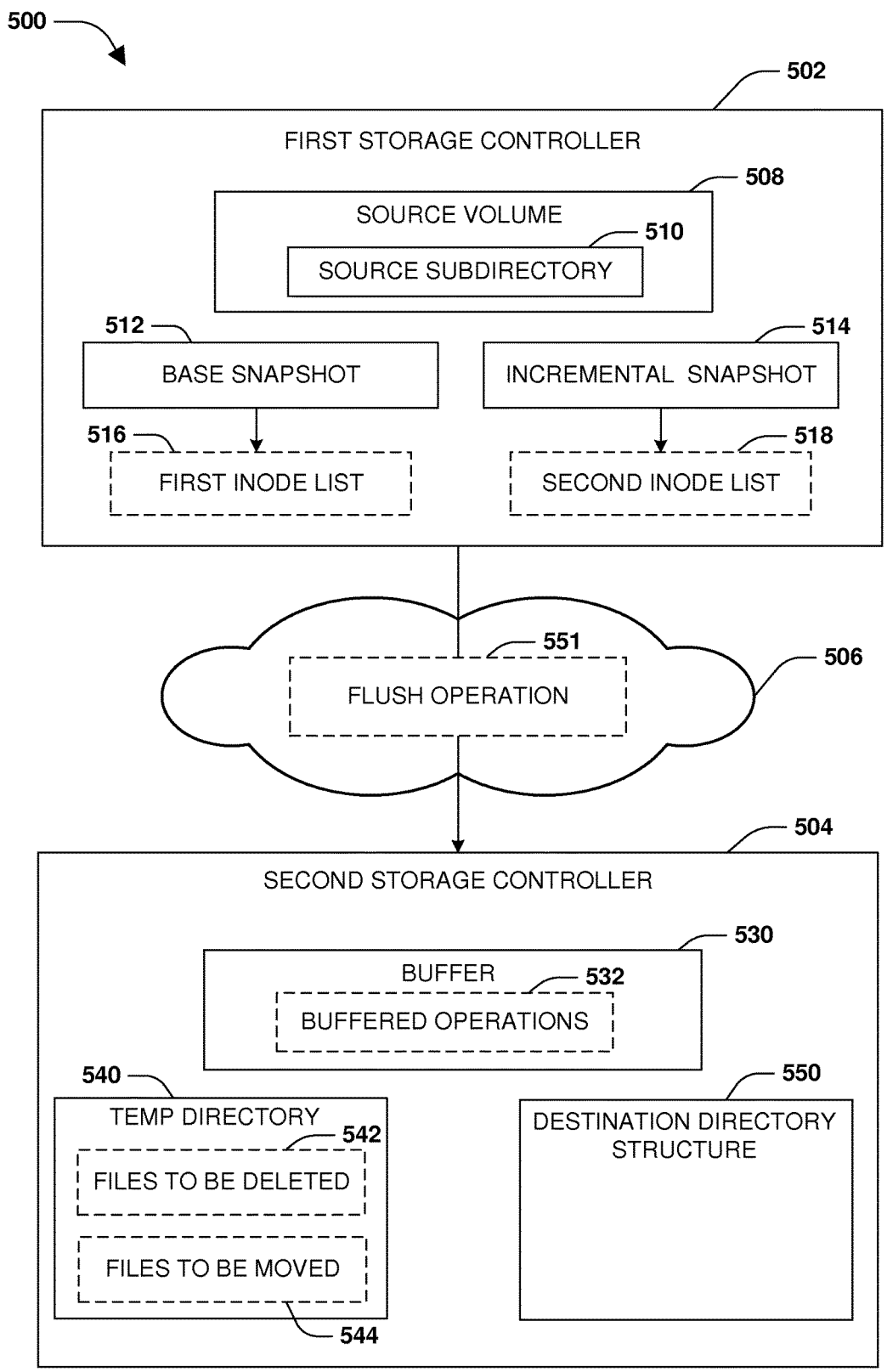
FIG. 5E is a component block diagram illustrating an exemplary computing device for directory level incremental replication, where a destination directory structure is constructed.

FIG. 5E illustrates the second storage controller 504 receiving a flush operation 551 from the first storage controller 502. Accordingly, the second storage controller 504 may implement directory move operations and new directory creation operations from the buffer 530 to construct a destination directory structure 550 corresponding to the source directory structure of the source subdirectory 510 as reflected within the incremental snapshot 514.

Figure 5F:
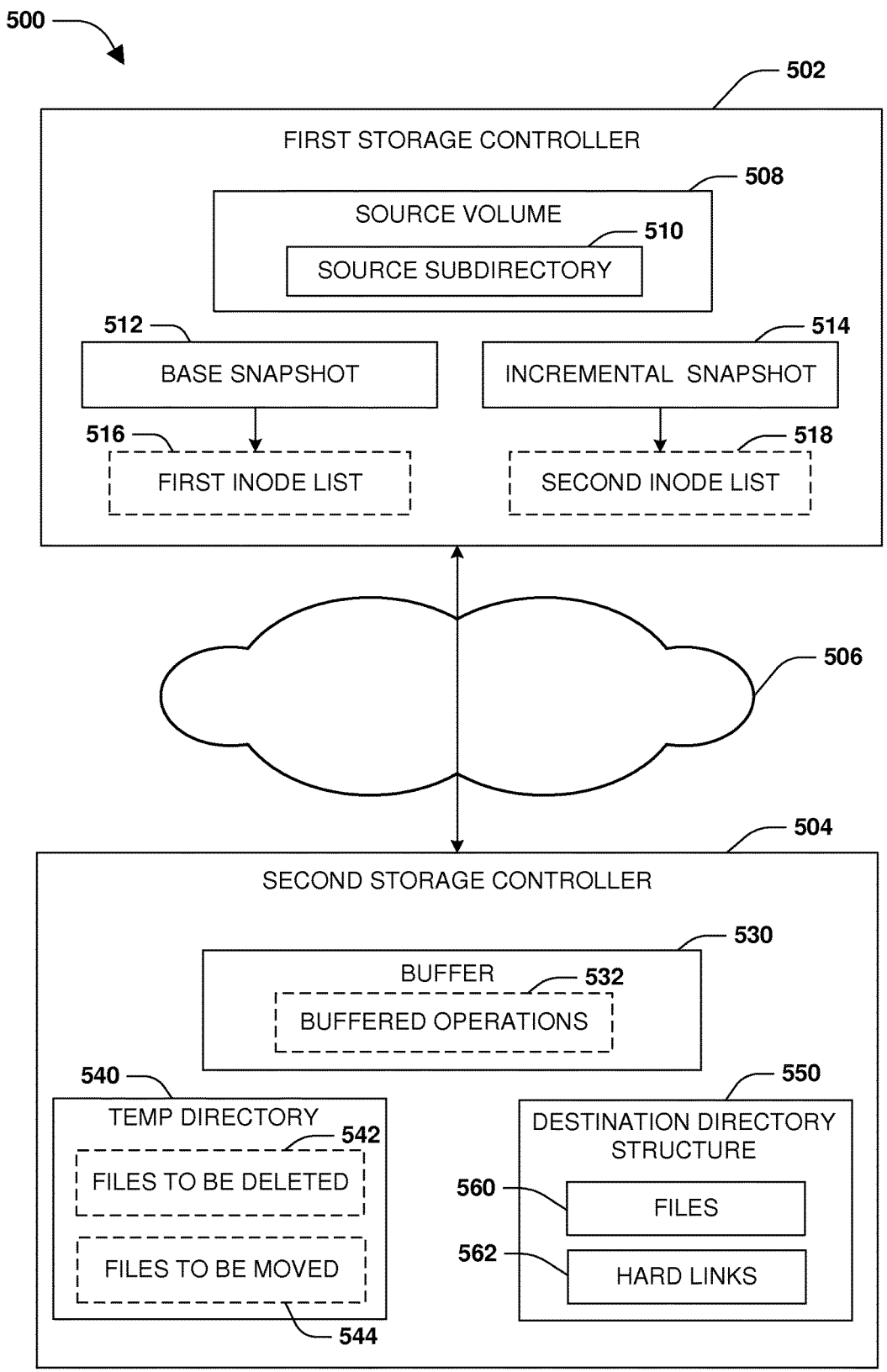
FIG. 5F is a component block diagram illustrating an exemplary computing device for directory level incremental replication, where file move operations, new file creation operations, and new hard link creation operations are implemented upon a destination directory structure.

FIG. 5F illustrates the second storage controller 504 implementing file move operations, new file creation operations, new hard link creation operations, and/or hard link move operations upon the destination directory structure 550. In this way, files 560 and hard links 562 may be populated within the destination directory structure 550 to mirror how files and hard links are stored within the source subdirectory 510.

Figure 5G:
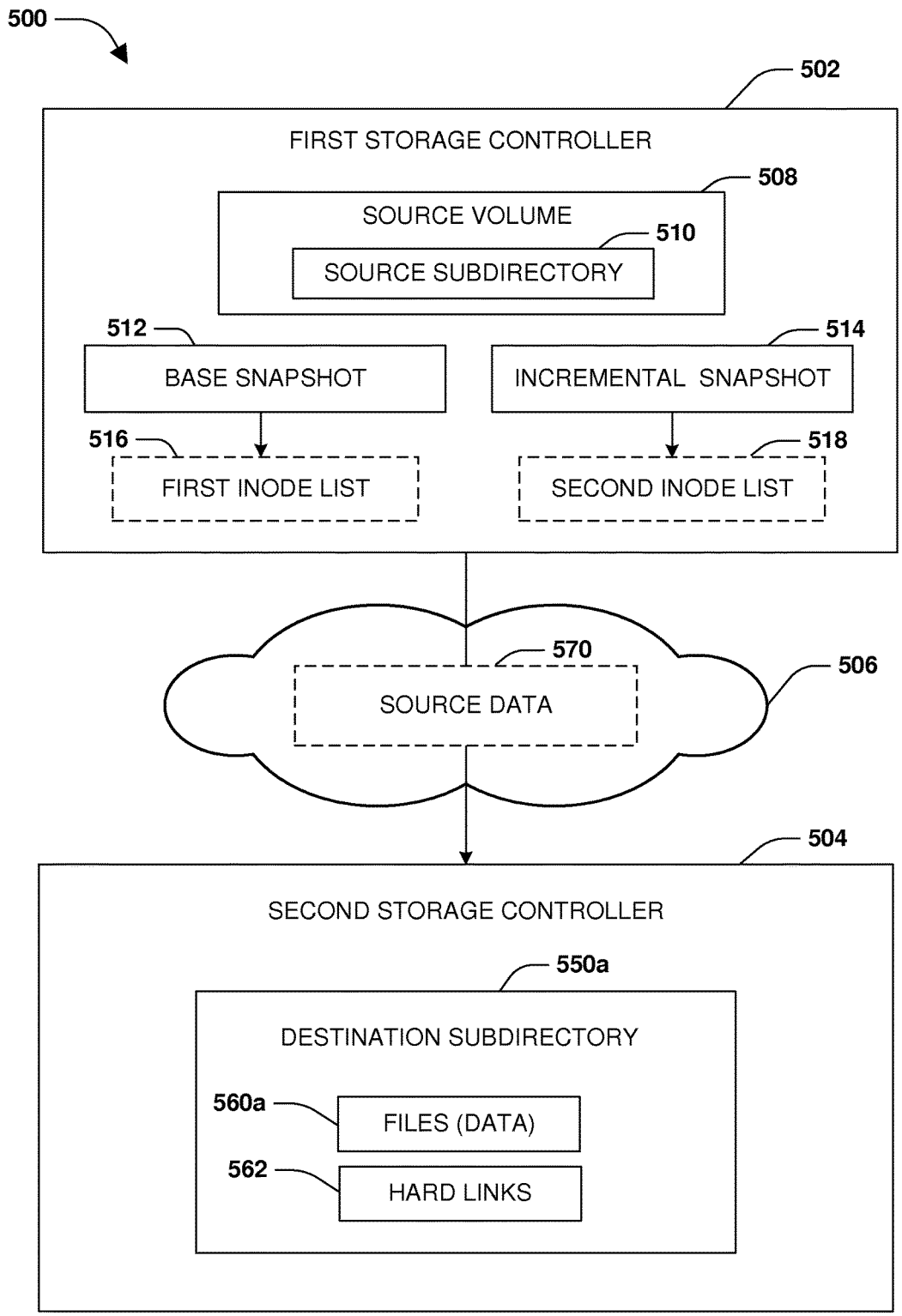
FIG. 5G is a component block diagram illustrating an exemplary computing device for directory level incremental replication, where source data is used to populate files within a destination directory structure.

FIG. 5G illustrates the second storage controller 504 receiving source data 570 (e.g., data blocks corresponding to differences between files within the base snapshot 512 and the incremental snapshot 514). The second storage controller 504 may populate the files 560 with the source data 570 to create populated files 560a within the destination directory structure 550 to create a destination subdirectory 550a. In this way, the destination subdirectory 550a may mirror the source subdirectory 510.

Figure 6:
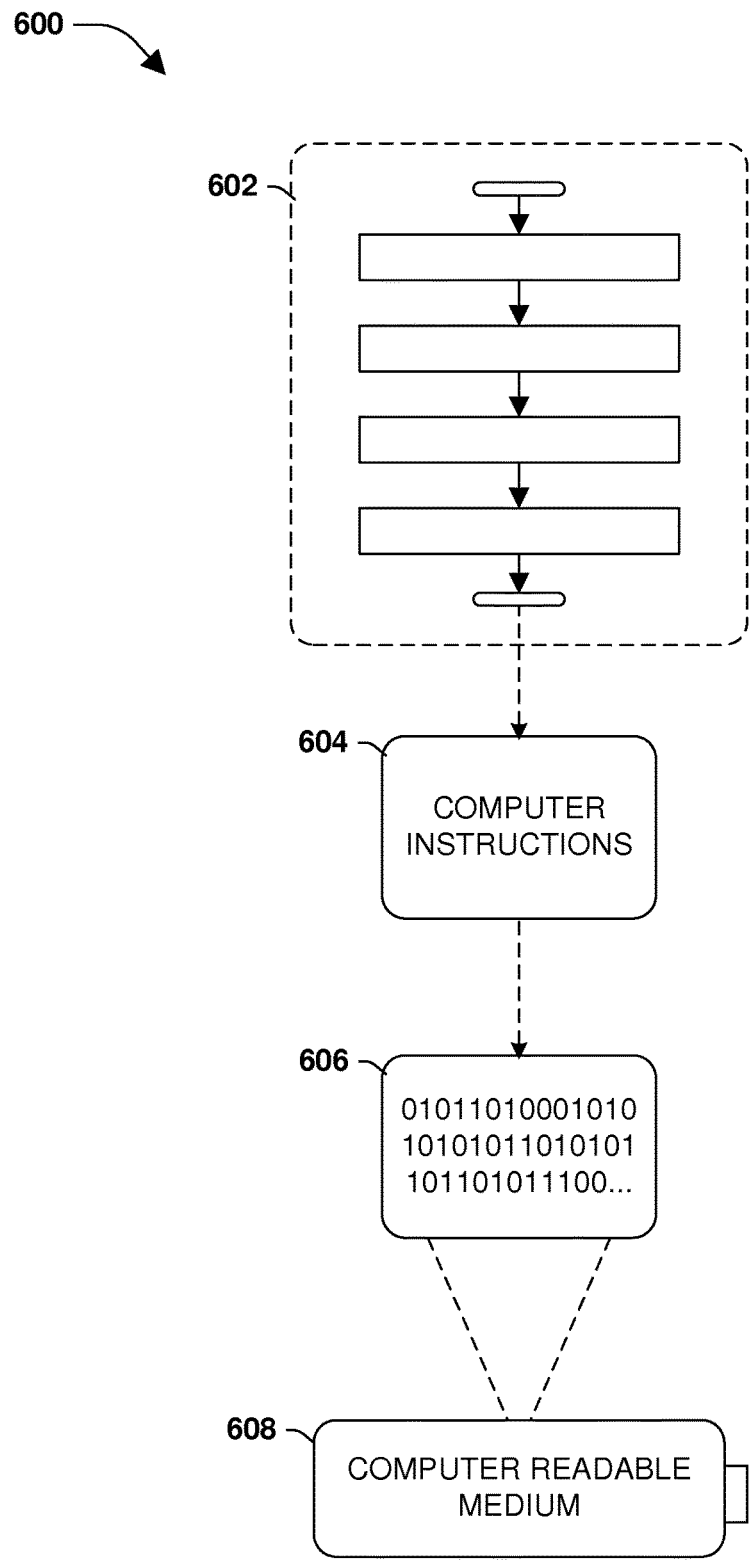
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-ft DVD-R, flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3 and/or at least some of the exemplary method 400 of FIG. 4, for example. In some embodiments, the processor-executable computer instructions 604 are configured to implement a system, such as at least some of the exemplary system 500 of FIGS. 5A-5G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
receiving, by a second storage controller, a set of operations from a first storage controller, the set of operations corresponding to an incremental replication of a source subdirectory hosted by the first storage controller;
moving files, associated with delete operations and move operations of the set of operations, into a temporary directory;
buffering the move operations and creation operations into a buffer;
implementing directory operations from the buffer to construct a destination directory structure corresponding to a source directory structure of the source subdirectory;
implementing file operations upon the destination directory structure; and
populating files within the destination directory structure based upon source data, wherein the populating comprises:
receiving a data block name of a source data block from the first storage controller; and
sending an indicator to the first storage controller requesting the source data block based upon a determination that the second storage controller does not have access to a destination data block corresponding to the source data block, otherwise, refraining from sending the indicator.

2. The method of claim 1, wherein the moving files comprises:
assigning a name to a file, moved into the temporary directory, based upon a parent inode directory number and a file name associated with the file.

3. The method of claim 1, wherein the populating files comprises:
evaluating a lookup table using the data block name to determine whether the second storage controller has access to the destination data block.

4. The method of claim 1, wherein the populating files comprises:
populating the destination directory structure with compressed source data from the first storage controller while retaining a compression of the compressed source data.

5. The method of claim 1, wherein the populating files comprises:
receiving the source data block from the first storage controller, wherein the source data block corresponds to a difference between a base snapshot and an incremental snapshot of the source subdirectory.

6. The method of claim 1, wherein the incremental replication is at a subdirectory granularity where the source subdirectory, but not a second source subdirectory, of a source volume is replicated from the first storage controller to the second storage controller.

7. The method of claim 1, comprising:
performing a directory level restore utilizing the destination directory structure to restore the source subdirectory.

8. A non-transitory machine readable medium having stored thereon instructions which when executed by a machine, cause the machine to:
compare a first inode file of a base snapshot with a second inode file of an incremental snapshot to create a list of changed inode file blocks;
utilize the list of changed inode file blocks to generate a set of operations corresponding to an incremental replication of a source subdirectory hosted by a first storage controller to a second storage controller;
send the set of operations to the second storage controller; and
sending source data to the second storage controller for populating a destination directory structure constructed using the set of operations by the second storage controller, wherein the sending comprises:
sending a data block name of a source data block to the second storage controller;
sending the source data block to the second storage controller based upon receiving an indication that the second storage controller does not have access to a destination data block corresponding to the source data block; and
refraining from sending the source data block based upon not receiving the indication.

9. The non-transitory machine readable medium of claim 8, wherein the instructions cause the machine to:
extract inode numbers, generation numbers, file paths, and file types of files within the source subdirectory within a base snapshot; and
extract inode numbers, generation numbers, file paths, and file types of files within the source subdirectory within an incremental snapshot.

10. The non-transitory machine readable medium of claim 8, wherein the instructions cause the machine to:
use file paths of inodes within the list of changed inode file blocks to resynchronize a first leg of a cascading relationship of snapshots and a second leg of the cascading relationship of snapshots.

11. The non-transitory machine readable medium of claim 8, wherein the set of operations comprises a directory move operation, a new directory creation operation, and a delete directory operation.

12. The non-transitory machine readable medium of claim 8, wherein the set of operations comprises a file move operation, a new file creation operation, and a delete file operation.

13. The non-transitory machine readable medium of claim 8, wherein the set of operations comprises a hard link move operation, a new hard link creation operation, and a delete hard link operation.

14. The non-transitory machine readable medium of claim 8, wherein the instructions cause the machine to:
generate a delete operation for a first inode existing within a base snapshot but not the an incremental snapshot;
generate a new creation operation for a second inode existing within the incremental snapshot but not the base snapshot; and
generate a move operation for a third inode existing at a first location within the base snapshot and a new location within the incremental snapshot.

15. The non-transitory machine readable medium of claim 8, wherein the source data block is to be replicated to the second storage controller for populating the destination directory structure.

16. The non-transitory machine readable medium of claim 8, wherein the source data comprises compressed source data that retains compression when populated into the destination directory structure.

17. The non-transitory machine readable medium of claim 8, wherein the instructions cause the machine to:
sort the first inode list and the second inode list based upon inode numbers.

18. A computing device comprising:
a memory containing machine readable medium comprising machine executable code having stored thereon instructions for performing a method of replication; and
a processor coupled to the memory, the processor configured to execute the machine executable code to cause the processor to:
receive a set of operations from a first storage controller, the set of operations corresponding to an incremental replication of a source subdirectory hosted by the first storage controller;
move files, associated with delete operations and move operations of the set of operations, into a temporary directory;
buffer the move operations and creation operations into a buffer;
implement directory operations from the buffer to construct a destination directory structure corresponding to a source directory structure of the source subdirectory as reflected by the incremental snapshot;
implement file operations upon the destination directory structure; and
populate files within the destination directory structure based upon source data by:
receiving a data block name of a source data block from the first storage controller; and
sending an indicator to the first storage controller requesting the source data block based upon a determination that the second storage controller does not have access to a destination data block corresponding to the source data block, otherwise, refraining from sending the indicator.

19. The computing device of claim 18, wherein the machine executable code causes the processor to:
evaluate a lookup table using the data block name to determine whether the second storage controller has access to the destination data block.

20. The computing device of claim 18, wherein the machine executable code causes the processor to:
populate the destination directory structure with compressed source data from the first storage controller while retaining a compression of the compressed source data.

* * * * *